(12) United States Patent
Watanabe et al.

(10) Patent No.: US 8,775,135 B2
(45) Date of Patent: Jul. 8, 2014

(54) METHOD AND DEVICE FOR DESIGNING CHROMATIC DISPERSION COMPENSATION

(75) Inventors: Rikiya Watanabe, Kawasaki (JP); Takuya Miyashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 434 days.

(21) Appl. No.: 13/217,998

(22) Filed: Aug. 25, 2011

(65) Prior Publication Data

US 2012/0123749 A1    May 17, 2012

(30) Foreign Application Priority Data

Nov. 15, 2010   (JP) .................................. 2010-254658

(51) Int. Cl.
*G06F 17/50*   (2006.01)

(52) U.S. Cl.
USPC .......... 703/2; 703/6; 703/18; 398/29; 398/81; 398/147

(58) Field of Classification Search
USPC .......................... 703/2, 6, 18; 398/29, 81, 147
See application file for complete search history.

(56) References Cited

U.S. PATENT DOCUMENTS

| 6,580,861 | B2* | 6/2003 | Bickham et al. ............. 385/123 |
| 7,050,671 | B1* | 5/2006 | Zhang et al. .................... 385/27 |
| 7,336,870 | B2 | 2/2008 | Ooi et al. |
| 7,359,645 | B2 | 4/2008 | Miyashita et al. |
| 7,496,261 | B2* | 2/2009 | Aikawa et al. ................ 385/127 |
| 7,983,564 | B2 | 7/2011 | Ooi et al. |
| 8,100,031 | B2* | 1/2012 | Zubiate et al. ............. 74/490.04 |
| 8,380,077 | B2* | 2/2013 | Takita et al. ................... 398/147 |
| 2006/0062534 | A1* | 3/2006 | Aikawa et al. ................ 385/127 |
| 2006/0098987 | A1 | 5/2006 | Hoshida |
| 2009/0220241 | A1* | 9/2009 | Katagiri et al. ................. 398/81 |
| 2010/0080556 | A1* | 4/2010 | Takita et al. .................... 398/43 |
| 2010/0098434 | A1 | 4/2010 | Katagiri et al. |
| 2010/0215377 | A1* | 8/2010 | Tajima et al. ................. 398/147 |
| 2011/0052198 | A1* | 3/2011 | Ohtani ........................... 398/81 |

FOREIGN PATENT DOCUMENTS

| JP | 2005-318474 A | 11/2005 |
| JP | 2006-135788 A | 5/2006 |
| JP | 2006-245706 A | 9/2006 |
| JP | 2008-193257 A | 8/2008 |
| JP | 2008-228002 A | 9/2008 |
| JP | 2009-212565 A | 9/2009 |
| JP | 2010-098559 A | 4/2010 |

* cited by examiner

*Primary Examiner* — Thai Phan
(74) *Attorney, Agent, or Firm* — Fujitsu Patent Center

(57) ABSTRACT

A design method includes calculating a calculated compensation amount of a dispersion compensation module arranged on each of a plurality of wavelength paths in such a way that a residual chromatic dispersion value of each of the wavelength paths which transmits an optical signal between an initial node and a final node satisfies a tolerance condition given in accordance with a priority given to each of the wavelength paths; and deciding a decision value to be applied as the compensation amount of the dispersion compensation module based on the calculated compensation amount based on a plurality of candidate values each being prepared in advance as the candidate for the compensation amount of the dispersion compensation module.

12 Claims, 10 Drawing Sheets

METHOD AND DEVICE FOR DESIGNING CHROMATIC DISPERSION COMPENSATION

CROSS-REFERENCE TO RELATED APPLICATIONS

This application is based upon and claims the benefit of priority of the prior Japanese Patent Application No. 2010-254658, filed on Nov. 15, 2010, the entire contents of which are incorporated herein by reference.

FIELD

The embodiment discussed herein relates to a method and a device for designing chromatic dispersion compensation, e.g., in an optical network.

BACKGROUND

Quality of an optical signal transmitted through an optical transmission channel such as an optical fiber depends upon chromatic dispersion. Thus, in order to reduce waveform degradation of an optical signal caused by chromatic dispersion in long-distance optical transmission, one or a plurality of dispersion compensation modules is provided on an optical transmission channel. In this case, a compensation amount of each of the dispersion compensation modules is adjusted so that, e.g., residual chromatic dispersion of a path that optical signals of respective wavelengths are transmitted (called the "wavelength path" hereafter) through stays within a dispersion tolerance on a receiving end.

A method for deciding a compensation amount in accordance with a dispersion compensation map is disclosed as one of methods for designing chromatic dispersion compensation in an optical network. In this case, the dispersion compensation map is often provided for intervals between, voluntarily chosen, two points (or between, voluntarily chosen, two optical nodes) as usual. The compensation amounts of the dispersion compensation modules are set in the optical network in accordance with the dispersion compensation map, so that the waveform degradation caused by the chromatic dispersion of the wavelength path that the optical signals are transmitted through between the above voluntarily chosen two points can be reduced.

According to the method for deciding a compensation amount in accordance with the dispersion compensation map, however, an error between a design value of the chromatic dispersion of an optical transmission channel and a practical value of the chromatic dispersion or an error caused by discrete compensation amounts of the dispersion compensation modules exists, and the error accumulates depending upon the wavelengths. Further, even if a compensation amount of a dispersion compensation module is set between voluntarily chosen two points in accordance with the dispersion compensation map in an optical network where an optical add drop multiplexer (OADM) or a wavelength cross connect node is employed in recent years, a compensation amount which is not the optimum may possibly be set to a wavelength path set between other voluntarily chosen two points located between the above two points. Thus, it is difficult to implement chromatic dispersion compensation suited to a desired dispersion compensation map for every wavelength used on the optical network.

In order to solve the above problem, e.g., extract a plurality of wavelength paths from an optical network having complicated topology, a design method is disclosed in which all residual chromatic dispersion values are set within an allowable residual chromatic dispersion range set to all the wavelength paths at respective end points of the wavelength paths, and a dispersion compensation amount is provided for a dispersion compensation module for each of the wavelength paths. According to the design method, an optimum combination of candidate values of the compensation amount to minimize a summation of errors between the residual chromatic dispersion values and residual chromatic dispersion target values of the respective wavelength paths is decided so as to set the compensation amount of each of the dispersion compensation modules.

The compensation amount of chromatic dispersion means, in the specification, that a chromatic dispersion amount is compensated so that an optical signal having chromatic dispersion can be received adequately or somehow suitably enough not to cause a trouble in ordinary communication.

Japanese Laid-open patent Publication No. 2009-212565 is a related art.

The design method described above assumes an environment in which a plurality of kinds of candidate values of the compensation amount is set (or prepared, in some cases) in advance. It is necessary, in the above environment, to decide a presumably optimum one of lots of combinations formed by the plural kinds of candidate values. Thus, according to the design method described above, the presumably optimum one of the combinations is decided by the use of mixed integer programming. As the number of the candidate values of the compensation amount increases, however, the number of the combinations of the candidate values becomes huge. Thus, according to the above design method using the mixed integer programming, an amount of operations to decide the presumably optimum one of an enormous number of the combinations may swell enormously. Assume, e.g., an optical network in which 26 optical nodes are connected to one another via 23 spans. Assume that the optical nodes are each provided with a dispersion compensation module and that there are 21 kinds of candidate values which can be set to the respective dispersion compensation modules (i.e., the optical nodes are each provided with one of dispersion compensation modules having 21 different kinds of compensation amounts). In this case, the number of the candidate values of the compensation amount sums up to $21^{26}$. It is extremely difficult from a viewpoint of an amount of arithmetic operations to decide the presumably optimum one of the enormous number of the combinations.

SUMMARY

A design method including calculating a calculated compensation amount of a dispersion compensation module arranged on each of a plurality of wavelength paths in such a way that a residual chromatic dispersion value of each of the wavelength paths which transmits an optical signal between an initial node and a final node satisfies a tolerance condition given in accordance with a priority given to each of the wavelength paths; and deciding a decision value to be applied as the compensation amount of the dispersion compensation module based on the calculated compensation amount based on a plurality of candidate values each being prepared in advance as the candidate for the compensation amount of the dispersion compensation module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment to implement the invention will be explained with reference to the drawings.

(1) Chromatic Dispersion Compensation Design System

Figure 1:
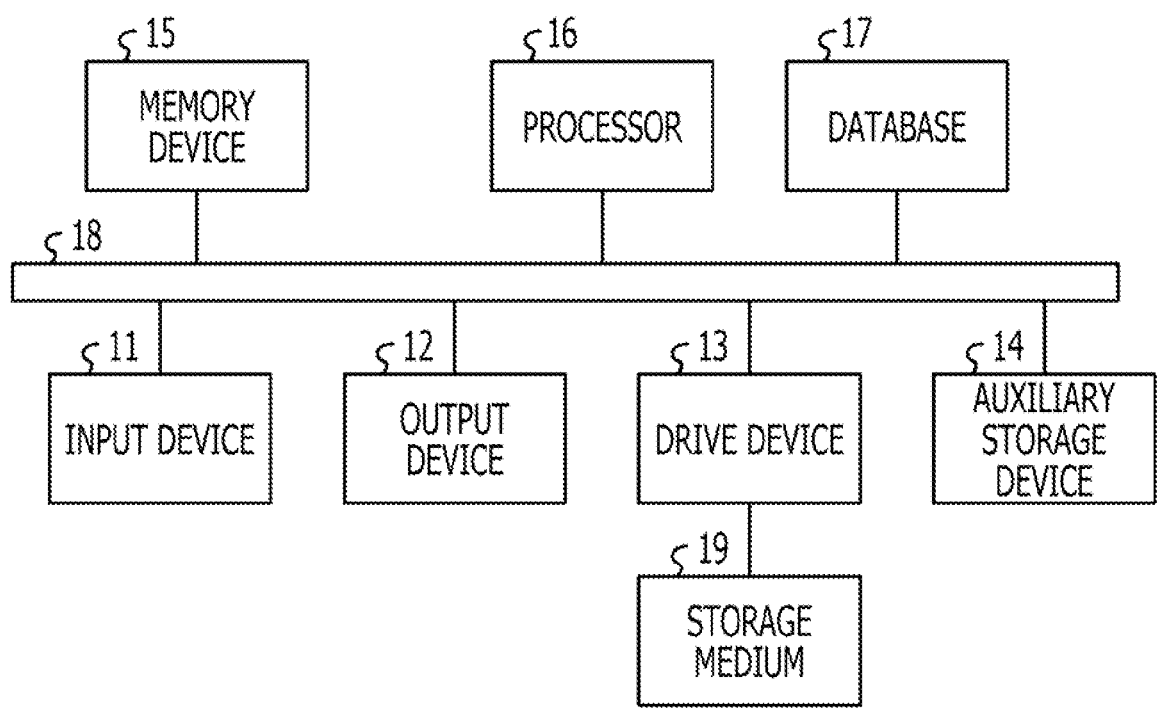
FIG. 1 illustrates an example of a chromatic dispersion compensation design device of the embodiment.

A chromatic dispersion compensation design device 1 will be explained with reference to FIG. 1. FIG. 1 illustrates an example of the chromatic dispersion compensation design device 1 of the embodiment.

As illustrated in FIG. 1, the chromatic dispersion compensation design device 1 of the embodiment has an input device 11, an output device 12, a drive device 13, an auxiliary storage device 14, a memory device 15, a processor 16 and a database 17. The input device 11, the output device 12, the drive device 13, the auxiliary storage device 14, the memory device 15, the processor 16 and the database 17 are connected to one another via a system bus 18. The chromatic dispersion compensation design device 1 may be either an exclusive use device or formed by an all-purpose personal computer or workstation.

The input device 11 has a keyboard, a mouse, etc. to be operated by a user or a system designer who enters various kinds of data. The output device 12 has a monitor on which various kinds of windows, data, etc. for operation of a program of the chromatic dispersion compensation design device 1 (called the "chromatic dispersion compensation design program", hereafter) are displayed. The chromatic dispersion compensation design program installed in the chromatic dispersion compensation design device 1 is provided, e.g., by means of a storage medium 19 such as a CD-ROM, for example. The storage medium 19 on which the chromatic dispersion compensation design program is recorded may be put in the drive device 13, and the chromatic dispersion compensation design program stored in the storage medium 19 may be installed from the storage medium 19 into the auxiliary storage device 14 (formed, e.g., by a magnetic disk device or a memory device) via the drive device 13. The chromatic dispersion compensation design program may be installed in the auxiliary storage device 14 in advance, though, or may be provided by being downloaded via a network, instead.

The processor 16 is, e.g., a CPU (Central Processing Unit). The processor 16 controls various kinds of arithmetic operations and an entire process of the chromatic dispersion compensation design device 1 including individual processes described later on the basis of information stored in and read from the memory device 15. Further, the CPU 16 can obtain various data for running the chromatic dispersion compensation design program from the database 17, and can store such data in the database 17.

(2) First Exemplary Operation of Chromatic Dispersion Compensation Design Device A first exemplary operation of the chromatic dispersion compensation design device 1 (first exemplary method for designing chromatic dispersion compensation) will be explained with reference to FIGS. 2-5.

(2-1) Outline of First Exemplary Operation

Figure 2:
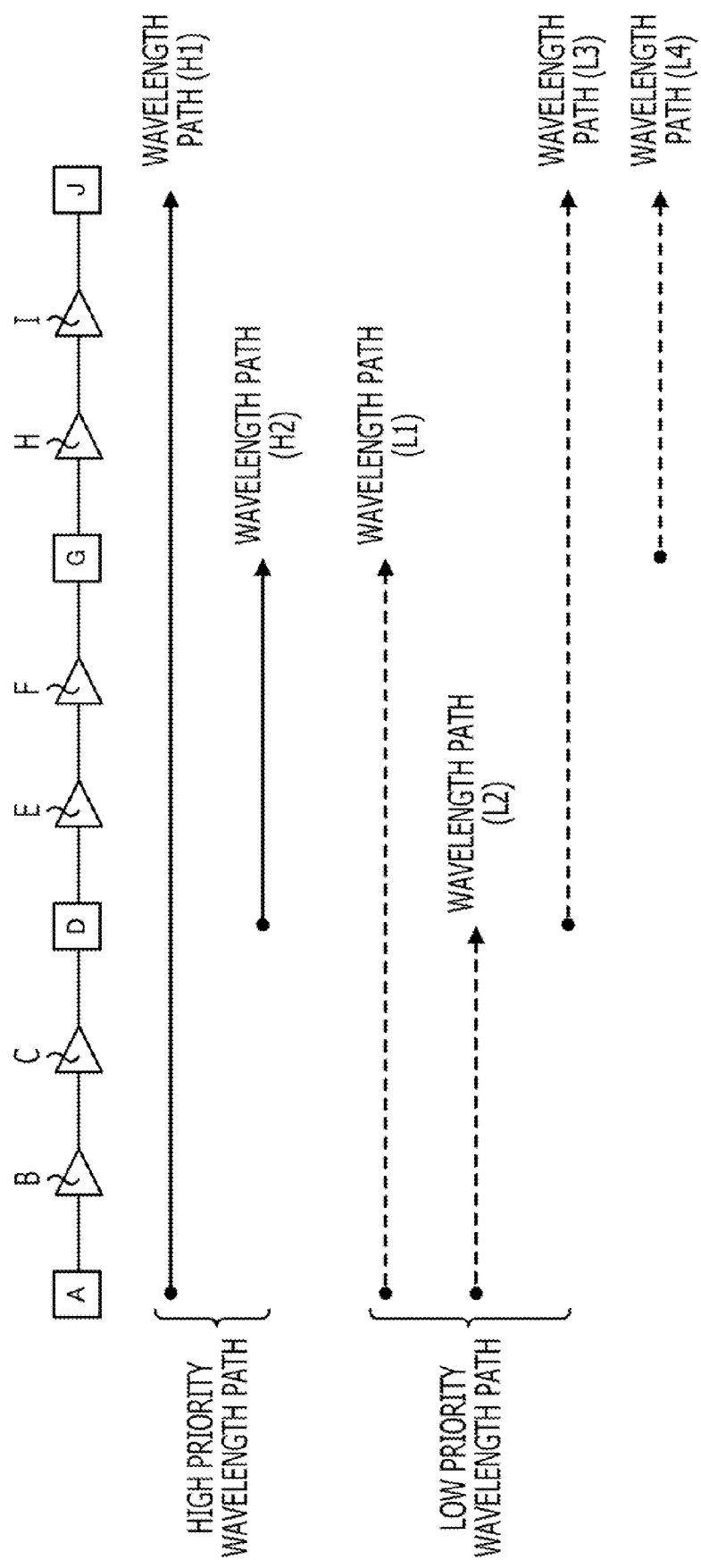
FIG. 2 illustrates an outline of a first exemplary operation.

FIG. 2 illustrates an outline of the first exemplary operation. FIG. 2 illustrates an optical network having optical add drop multiplexing nodes A, D, G and J. The optical add drop multiplexing nodes each have an optical add drop multiplexer (OADM), and provide functions for dropping and adding optical signals for individual wavelengths. Optical relay nodes B and C are provided between the optical add drop multiplexing nodes A and D. Optical relay nodes E and F are provided between the optical add drop multiplexing nodes D and G. Optical relay nodes H and I are provided between the optical add drop multiplexing nodes G and J. The optical relay nodes B, C, E, F, H and I each have an optical amplifier which amplifies an optical signal. Incidentally, the optical add drop multiplexing nodes A, D, G and J may each have an optical amplifier. The nodes A-J of the embodiment each preferably have a dispersion compensation module (DCM). It is unnecessary, though, that all the nodes A-J each have a DCM.

According to the first exemplary operation, wavelength paths (or intervals) are each given a priority. The "wavelength path" transmits an optical signal from an initial node to a final node in an optical network. In the optical network illustrated in FIG. 2, a wavelength path can be set between any paired optical add drop multiplexing nodes. As illustrated in FIG. 2, e.g., a wavelength path H1 is set between the optical add drop multiplexing nodes A and J, and a wavelength path H2 is set between the optical add drop multiplexing nodes D and G. The wavelength paths H1 and H2 are each given a high priority. In other intervals, wavelength paths L1-L4, each given a low priority, may be set. As illustrated in FIG. 2, e.g., a wavelength path L1 is set between the optical add drop multiplexing nodes A and G, a wavelength path L2 is set between the optical add drop multiplexing nodes A and D, a wavelength path L3 is set between the optical add drop multiplexing nodes D and J, and a wavelength path L4 is defined between the optical add drop multiplexing nodes G and J. Incidentally, the wavelength paths L1-L4 may each include a wavelength path imaginarily set to an interval which transmits no optical signal.

According to the first exemplary operation, a compensation amount of the dispersion compensation module that the nodes A-J are each provided with is decided in such a way as to satisfy following condition.

To a high priority wavelength path, specifically, set a residual chromatic dispersion target value on a final node. As to each of the high priority wavelength paths, calculate an error between the residual chromatic dispersion value and the residual chromatic dispersion target value on the final node. Then, decide the compensation amounts of the respective dispersion compensation modules in such a way that a summation of the errors on all the high priority wavelength paths is minimized. As illustrated in FIG. 2, e.g., set residual chromatic dispersion target values T1 and T2 to the wavelength paths H1 and H2, respectively. Further, calculate residual chromatic dispersion values D1 and D2 on the nodes J and G for the wavelength paths H1 and H2, respectively. Still further, calculate errors Δ1 (=D1−T1) and Δ2 (=D2−T2) for the wavelength paths H1 and H2, respectively. In this case, the condition that "the summation of the errors Δ1 and Δ2 is minimized" is produced so that the compensation amounts of the respective dispersion compensation modules are decided.

To a low priority wavelength path, meanwhile, set a residual chromatic dispersion tolerance (in other words, a tolerable residual chromatic dispersion range) on the final node. Define a constraint as to each of the low priority wavelength paths such that the residual chromatic dispersion value on the final node remains within the residual chromatic dispersion tolerance. As illustrated in FIG. 2, e.g., set a residual chromatic dispersion tolerance to each of the wavelength paths L1-L4. Further, calculate a residual chromatic dispersion value of the wavelength path L1 on the node G, a residual chromatic dispersion value of the wavelength path L2 on the node D, a residual chromatic dispersion value of the wavelength path L3 on the node J, and a residual chromatic dispersion value of the wavelength path L4 on the node J. In this case, the condition that "the residual chromatic dispersion values of the wavelength paths L1-L4 each remain within the corresponding residual chromatic dispersion tolerance" is produced so that the compensation amounts of the respective dispersion compensation modules are decided. Incidentally, the low and high priorities may be each given priorities of a plurality of levels.

According to the design method of the first exemplary operation, as described above, the residual chromatic dispersion value is optimized for a high priority wavelength path, and thus transmission quality of the wavelength path which practically transmits an optical signal is good. Further, even a low priority wavelength path satisfies the specific residual chromatic dispersion tolerance. Thus, transmission quality of a new wavelength path having been set by the use of a low priority wavelength path is not degraded much.

Besides, according to the first exemplary operation, a compensation amount of a dispersion compensation module is decided in the condition described above as follows. To put it specifically, at first, calculate the compensation amount of each of the dispersion compensation modules which satisfy the condition described above without paying attention to a plurality of discrete values (DCM candidate values or DCM menu values) set or prepared as candidates of the compensation amounts of the dispersion compensation modules. In other words, calculate the compensation amounts of the respective dispersion compensation modules which satisfy the condition described above independently of the plural DCM menu values. That is, calculate the compensation amounts of the respective dispersion compensation modules which each satisfy the condition such that the residual chromatic dispersion value is optimized for a high priority wavelength path and that the residual chromatic dispersion value of a low priority wavelength path remains within the residual chromatic dispersion tolerance independently of the plural DCM menu values. Incidentally, "calculate the compensation amounts without paying attention to (independently of) the DCM menu values" implies, e.g., "compensation amounts which may disagree with the DCM menu values". That is, a "compensation amount to be calculated" (including a calculated compensation amount) of the embodiment refers to a value, e.g., of a compensation amount being ideal (or theoretically optimum or preferable) for compensating chromatic dispersion, or of a compensation amount sufficient to carry out normal or steady optical transmission. Thus, the "calculated compensation amount" of the embodiment agrees with one of the DCM menu values prepared as discrete values in advance in some cases, and does not in other cases. Incidentally, an optical fiber which is practically used for an optical transmission path presumably has a chromatic dispersion value not being ideal because of a manufacturing error, for example.

Then, select two DCM menu values being closest to the calculated ideal value from the plural DCM menu values for each of the dispersion compensation modules. Then, decide one of the two DCM menu values (i.e., a decision value practically applied to each of the dispersion compensation modules as its compensation amount) which satisfies the above condition. That is, decide one of the two DCM menu values having been selected for each of the dispersion compensation modules which satisfies the condition such that the residual chromatic dispersion value is optimized for a high priority wavelength path and that the residual chromatic dispersion value of the low priority wavelength path remains within the residual chromatic dispersion tolerance. That is, the decision value practically applied to each of the dispersion compensation modules as its compensation amount is decided.

According to the first exemplary operation, as described above, narrow down the number of the DCM menu values after calculating an ideal value of the compensation amount of each of the dispersion compensation modules without paying attention to the DCM menu values on the basis of the calculated ideal value. Then, decide one of the DCM menu values having been narrowed down which is practically applied to the dispersion compensation module as its compensation amount. Thus, the design method of the first exemplary operation causes a relatively lighter processing load for deciding the compensation amount of each of the dispersion compensation modules than that caused by a design method for deciding one DCM menu value practically applied to the dispersion compensation module as its compensation amount without narrowing down the number of the DCM menu values.

Figure 3:
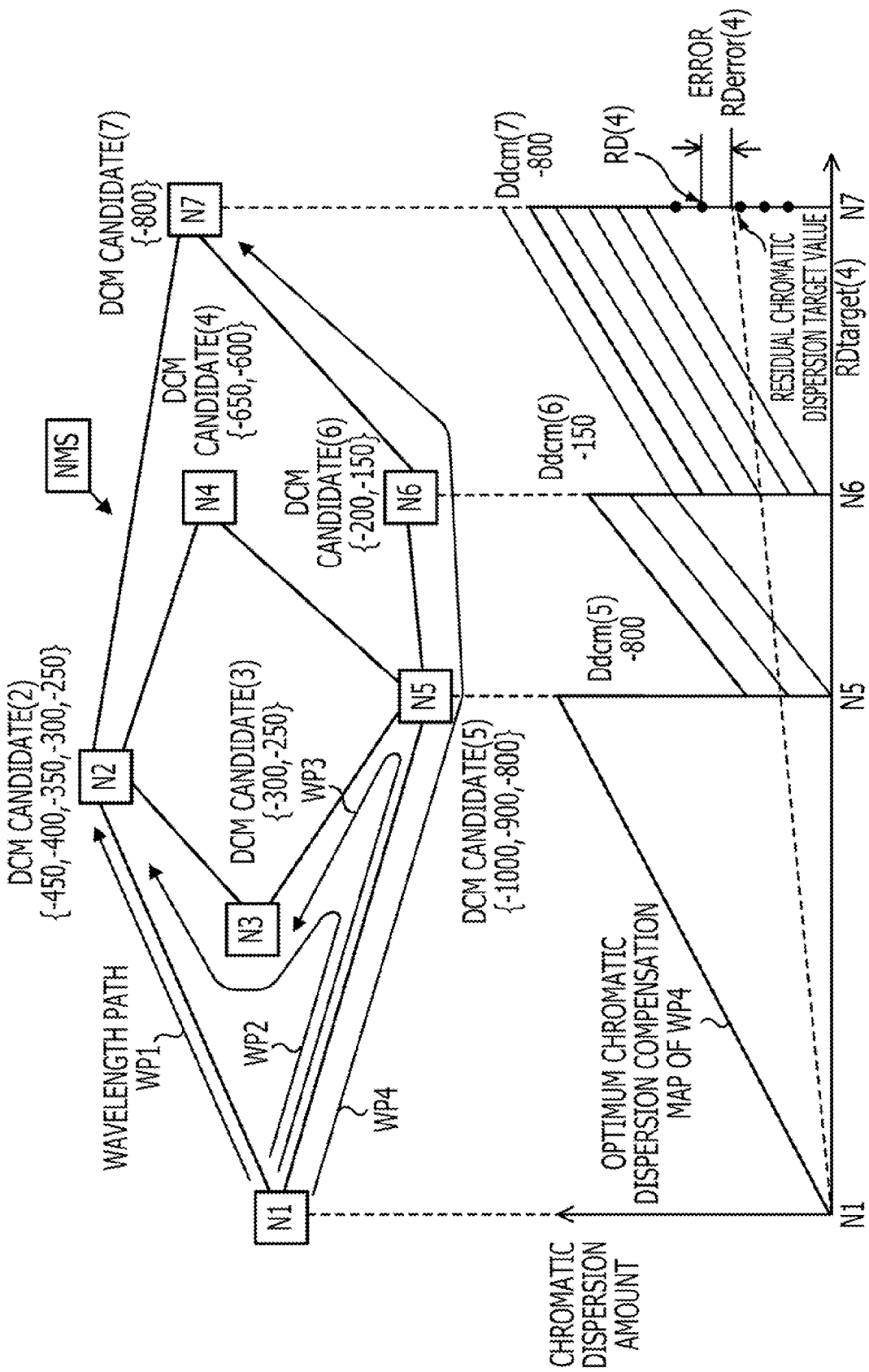
FIG. 3 illustrates an example of an optical network that the chromatic dispersion compensation design method is applied to and a dispersion map.

FIG. 3 illustrates an example of an optical network in which the chromatic dispersion compensation design method is used and an exemplary dispersion map. The optical network has nodes N1-N7. The nodes N1-N7 each have a dispersion compensation module. DCM menu values are prepared for the respective dispersion compensation modules. In FIG. 3, e.g., DCM menu values "−1000, −900, −800" are prepared for the dispersion compensation module of the node N5. DCM menu values "−200, −150" are prepared for the dispersion compensation module of the node N6. A DCM menu value "−800" is prepared for the dispersion compensation module of the node N7. Incidentally, a network management system NMS, e.g., unifies the operations of the nodes N1-N7.

Wavelength paths WP1-WP4 are set in the above optical network. The wavelength paths WP1-WP4 are each a high priority wavelength path. The chromatic dispersion map indicates that the wavelength path WP4 is in a chromatic dispersion state. In FIG. 3, e.g., "compensation amount=−800 [ps/nm]" is selected on the node N5, "compensation amount=−150 [ps/nm]" is selected on the node N6, and "compensation amount=−800 [ps/nm]" is selected on the node N7. A residual chromatic dispersion value RD(4) is thereby obtained. Further, a target value RDtarget(4) of the residual chromatic dispersion value on the node N7 being the final node is set to the wavelength path WP4. Thus, a residual chromatic dispersion error RDerror(4)=RD(4)−RDtarget(4) is calculated for the wavelength path WP4. Residual chromatic dispersion errors RDerror(1)-RDerror(3) are also calculated for the wavelength paths WP1-WP3, respectively. The residual chromatic dispersion errors are calculated for the respective high priority wavelength paths. Then, the compensation amounts of the dispersion compensation modules of the respective nodes are selected properly enough that the summation of the errors is minimized.

Low priority wavelength paths are set to respective intervals to which no high priority wavelength paths are set in the above optical network. A low priority wavelength path WP5 is set to an interval between the nodes N1 and N4 via the node N5.

Figure 4:
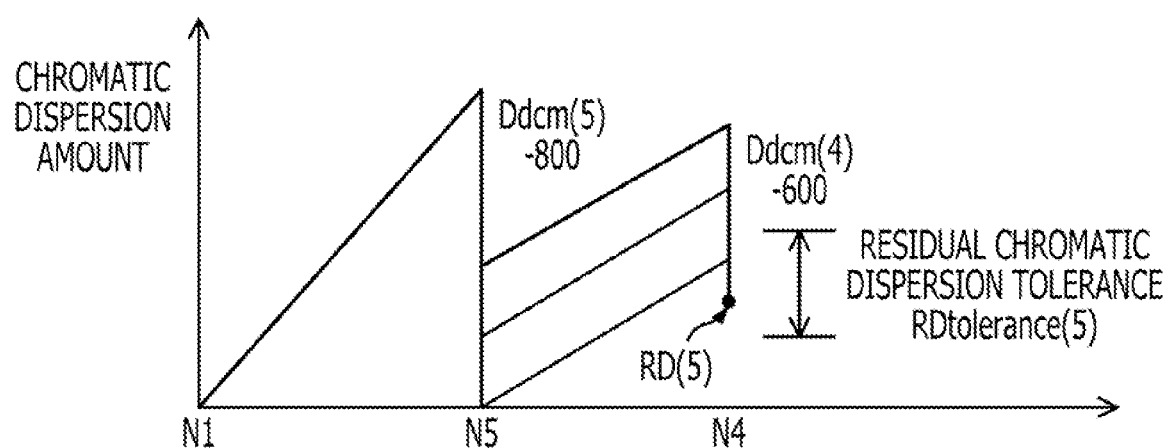
FIG. 4 illustrates an exemplary chromatic dispersion map of a low priority wavelength path.

FIG. 4 illustrates an exemplary chromatic dispersion map of the wavelength path WP5. In FIG. 4, "compensation amount=−600 [ps/nm]" is selected on the node N4. Incidentally, "compensation amount=−800 [ps/nm]" is selected on the node N5 as described above. A residual chromatic dispersion value RD(5) is thereby obtained. Further, a residual chromatic dispersion tolerance RDtolerance(5) on the node N4 being the final node is set to the wavelength path WP5.

The residual chromatic dispersion tolerance is expressed by upper and lower limit values of tolerable residual chromatic dispersion. Similarly, residual chromatic dispersion tolerances are set to other respective low priority wavelength paths. Then, the compensation amounts of the dispersion compensation modules of the respective nodes are selected properly enough that the residual chromatic dispersion values on the final ends of the respective low priority wavelength paths remain within the corresponding residual chromatic dispersion tolerances as described later in detail.

According to the first exemplary operation, in addition, the compensation amounts of the dispersion compensation modules, e.g., of the respective nodes N1-N7 are decided as follows. The dispersion compensation module on the node N5 will be paid attention to and explained below.

Calculate, at first, a calculated compensation amount of the dispersion compensation module on the node N5 without paying attention to the DCM menu values "−1000, −900, −800" of the dispersion compensation module on the node N5. Incidentally, as the DCM menu values "−1000, −900, −800" do not need to be considered, the calculated compensation amount may differ from any one of the DCM menu values "−1000, −900, −800". The calculated compensation amount may agree with any one of the DCM menu values "−1000, −900, −800" depending upon a calculated result as a matter of course. Assume, e.g., that a compensation amount "−950" is calculated as the calculated compensation amount in this case. Select then, from the DCM menu values "−1000, −900, −800", the two DCM menu values closest to the calculated compensation amount "−950" (i.e., "−1000 and −900" are selected). Decide then, from the two selected DCM menu values "−1000 and −900", one DCM menu value which satisfies the above condition (i.e., the decision value practically applied to each of the dispersion compensation modules as its compensation amount).

(2-2) Specific Flow of First Exemplary Operation

Figure 5:
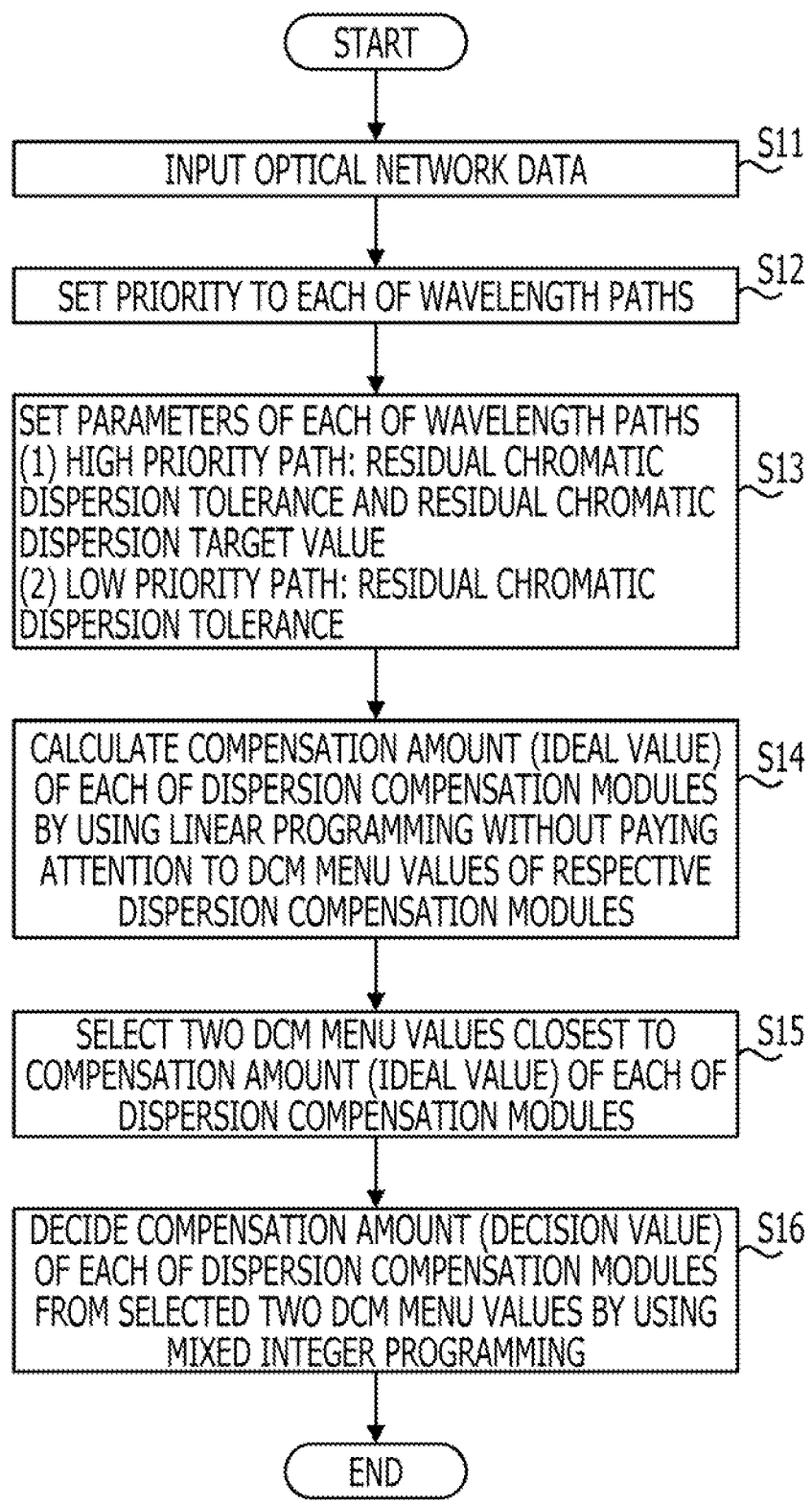
FIG. 5 illustrates a method of the first exemplary operation.

A specific flow of the first exemplary operation will be explained with reference to FIG. 5. FIG. 5 is a method which illustrates a flow of the first exemplary operation (i.e., a flow of a first exemplary chromatic dispersion compensation design). Incidentally, the method illustrated in FIG. 5 is run by the chromatic dispersion compensation design device 1, e.g., when the optical network is designed. The chromatic dispersion compensation design device 1 is implemented by means of the processor 16 running the chromatic dispersion compensation design program.

As illustrated in FIG. 5, the chromatic dispersion compensation design device 1 is provided with optical network data for the chromatic dispersion compensation design (operation S11). The chromatic dispersion compensation design device 1 is provided with the optical network data by, e.g., a system designer of the optical network via the input device 11. The optical network data having been provided is, e.g., stored in the database 17. The processor 16 may refer to the optical network data stored in the database 17 every time the processor 16 works as described later. The optical network data includes, e.g., network topology data, node data, span data and wavelength path data.

The network topology data includes data indicating arrangements of the respective nodes in the optical network, and conditions in connections among the nodes. The node data includes data for identification of types or functions (e.g., an optical add drop multiplexer or an optical relay node, etc.) of the respective nodes. Incidentally, the optical network of the embodiment may be constituted in such a way that all of the nodes have the dispersion compensation modules, or that only some of the nodes have the dispersion compensation modules. In the latter case, the node data may include data indicating whether the nodes each have a dispersion compensation module.

The span data includes data related to optical fibers used in respective spans (e.g., a fiber type, a fiber length, a chromatic dispersion value, a transmission loss, etc.). Incidentally, an optical transmission channel of the embodiment connecting the nodes adjacent to each other is called a "span". The wavelength path data includes path data of the respective optical signals transmitted on the optical network, a throughput (e.g., 2.4 Gbps, 10 Gbps, 40 Gbps, 100 Gbps, etc.), wavelength data and output power data of the optical signals outputted from the respective nodes. Incidentally, if a WDM signal is transmitted via one wavelength path, a parameter corresponding to a reference wavelength of the WDM signal is set. The reference wavelength is, e.g., in the middle of a wavelength band of the WDM signal.

Incidentally, the optical network data input to the chromatic dispersion compensation design device 1 is not limited to the above data, and may include other types of data related to parameters used for calculations of the compensation amounts.

The optical network data is input by the use of, e.g., a graphical user interface (GUI) or a character user interface. Instead, the optical network data may be collectively input from a file in which the optical network data and various parameters are stored.

Then, the processor 16 works so as to set priorities to the respective wavelength paths identified from the optical network data input at the operation S11 (operation S12).

One of a "high priority" and a "low priority" is set to each of the wavelength paths of the embodiment, and three or more priority levels may be set thereto.

The priority may be set to each of the wavelength paths on the basis of, e.g., instructions of a user or a system designer input to the chromatic dispersion compensation design device 1 via the input device 11. A high priority wavelength path may be set, e.g., to an interval in which an optical signal is practically transmitted when the optical network starts to work. Meanwhile, a low priority wavelength path may be set to an interval in which an optical signal will be transmitted later. Meanwhile, a low priority wavelength path may be set to all or some of intervals where no high priority wavelength path exists. If a high priority wavelength path includes a plurality of sub-node intervals in this case, a low priority wavelength path may be set to each of the sub-node intervals. If a high priority wavelength path is set to an interval A-G in FIG. 2, e.g., the interval A-G includes intervals A-D and D-G. In this case, a low priority wavelength path may be automatically set to the interval A-D. Incidentally, as illustrated in FIG. 2, e.g., a high priority wavelength path has already been set to the interval D-G.

Meanwhile, the priorities of the respective wavelength paths may be automatically set, e.g., in accordance with one or more preset conditions. To put it specifically, e.g., the priorities of the respective wavelength paths may be automatically set on the basis of the optical network data input at the operation S11. To put it more specifically, e.g., the high and low priorities may be set to wavelength paths of throughputs higher and lower than a threshold (e.g., 100 Gbps), respectively.

Then, the processor 16 works so as to set a residual chromatic dispersion tolerance and a residual chromatic dispersion target value on a final node to each of the high priority wavelength paths (operation S13). Meanwhile, the processor 16 works so as to set a residual chromatic dispersion tolerance on a final node to each of the low priority wavelength paths (operation S13).

The residual chromatic dispersion tolerance is decided on the basis of path data of the relevant wavelength path, node data related to nodes existing on the path, fiber data, a signal type of the wavelength path, output optical power from the respective nodes, etc. Incidentally, the residual chromatic dispersion tolerance is defined by upper and lower limit values of tolerable residual chromatic dispersion. The residual chromatic dispersion target value is preferably set in a middle region of the residual chromatic dispersion tolerance. Let the upper and lower limit values of the residual chromatic dispersion tolerance of a wavelength path i be RDtolerance_upper(i) and RDtolerance_lower(i), respectively. Then, the residual chromatic dispersion target value of the wavelength path i is preferably (RDtolerance_upper(i)+RDtolerance_lower(i))/2. Incidentally, the method for deciding the residual chromatic dispersion target value is not limited to the above example, and another method may be employed.

Then, the processor 16 works so as to calculate the compensation amount of each of the dispersion compensation modules that the optical network has by using various data having been set at the operations S11-S13 without paying attention to the DCM menu values (operation S14).

Calculate the compensation amount of each of the dispersion compensation modules by using linear programming at the operation S14. To put it specifically, set an objective function and constraints as follows, and calculate the compensation amount of each of the dispersion compensation modules in such a way that the following condition is satisfied. To "minimize the summation of the differences between the residual chromatic dispersion values on the final nodes of the high priority wavelength paths and the corresponding residual chromatic dispersion target values (i.e., the accumulated chromatic dispersion compensation errors of the respective wavelength paths)" is set to the objective function. That "the accumulated chromatic dispersion values on the final nodes of the low priority wavelength paths each remain within the corresponding tolerable residual chromatic dispersion range" is set to the constraints. Incidentally, a constraint that "the compensation amounts which can be set to the respective dispersion compensation modules are selected from the DCM menu values" is not set in the phase of the operation S14 of the embodiment.

A target function is expressed by Equation 1 below. The constraints are expressed by Equations 2-4 below. Let Ghi be an identifier (variable) for identifying a high priority wavelength path.

Let Gli be an identifier (variable) for identifying a low priority wavelength path. Let s be an identifier (variable) for identifying a span. Let c be an identifier (variable) for identifying a DCM menu value. Let negRDerror[Ghi] be a variable (of a positive value all the time) indicating an error in case of "residual chromatic dispersion value-residual chromatic dispersion target value<=0" on the high priority wavelength path i. Let posRDerror[Ghi] be a variable (of a positive value all the time) indicating an error in case of "residual chromatic dispersion value-residual chromatic dispersion target value>=0" on the high priority wavelength path i. Let term[Ghi] be a variable indicating the residual chromatic dispersion value on the final node of the high priority wavelength path i. Let RDtarget[Ghi] be a variable or a constant indicating the residual chromatic dispersion target value of the high priority wavelength path i. Let term[Glj] be a variable indicating the residual chromatic dispersion value on the final node of the low priority wavelength path j. Let RDtolerance_upper[Glj] be a variable or a constant indicating the upper limit value of the residual chromatic dispersion tolerance of the low priority wavelength path j. Let Rdtolerance_lower[Glj] be a variable or a constant indicating the lower limit value of the residual chromatic dispersion tolerance of the low priority wavelength path j. Let term[g] be a variable indicating the residual chromatic dispersion value on the final node of the wavelength path g (the high priority wavelength path i or the low priority wavelength path j).

$$\text{Minimize} \sum_{Gh_i} (negRDerror[Gh_i] + posRDerror[Gh_i]) \quad \text{Equation 1}$$

$$term[Gh_i] - posRDerror[Gh_i] + negRDerror[Gh_i] = \quad \text{Equation 2}$$
$$RDtarget[Gh_i](\text{for } \forall\ Gh_i)$$

$$term[Gl_j] - RDtolerance\_upper[Gl_j] \le 0 (\text{for } \forall\ Gl_j) \quad \text{Equation 3}$$

$$term[Gl_j] - RDtolerance\_lower[Gl_j] \ge 0 (\text{for } \forall\ Gl_j) \quad \text{Equation 4}$$

A first equation of the constraints expresses an error in the compensation amount of the chromatic dispersion compensation of the high priority wavelength path i. The second to forth equations of the constraints expresses a fact that the residual chromatic dispersion value on the final node of the low priority wavelength path j remains within the residual chromatic dispersion tolerance.

If the objective function and the constraints in the linear programming are set as described above, the compensation amount of the dispersion compensation module that the nodes each have can be easily calculated by the use of all-purpose mathematical planning software. That is, one compensation amount is calculated for each of the dispersion compensation modules in such a way that the above objective function is satisfied in the above constraints.

Then, the processor 16 works so as to select, for each of the dispersion compensation modules, two DCM menu values closest to the compensation amount of the dispersion compensation module calculated at the operation S14 from a plurality of discrete menu values preset or prepared for each of the dispersion compensation modules (operation S15). In other words, two DCM menu values of smallest errors against the compensation amount of the dispersion compensation module calculated at the operation S14 are selected from a plurality of discrete menu values preset or prepared for each of the dispersion compensation modules. Assume, e.g., that a plurality of DCM menu values which are "−1000, −950, −900, −850, −800, −700" are preset or prepared for a certain dispersion compensation module. If the compensation amount of the dispersion compensation module calculated at the operation S14 is "−875" in this case, the two DCM menu values closest to the calculated compensation amount, "−850" and "−900", are selected.

Incidentally, the DCM menu values may be included in the optical network data. In this case, the processor 16 may obtain the DCM menu values from the optical network data stored in the database 17. Meanwhile, the DCM menu values may be suitably calculated by the chromatic dispersion compensation design device 1. Further, the DCM menu values are not limited to discrete values.

Then, the processor 16 works so as to decide one DCM menu value to be practically applied to each of the dispersion compensation modules as its compensation amount (i.e., the decision value of the compensation amount) from the two DCM menu values of each of the dispersion compensation modules selected at the operation S15 (operation S16).

As a combination including one DCM menu value decided from the two discrete menu values of each of the dispersion compensation modules is selected at the operation S16, a decision value of the compensation amount of each of the dispersion compensation modules is calculated by the use of mixed integer programming. To put it specifically, the objective function and the constraints are same as those used at the operation S14 (refer to Equations 1-4). Besides, a new constraint such that one of two DCM menu values selected for a certain span s (i.e., a dispersion compensation module put on a certain span s) is selected and is added at the operation S16. That is, a constraint such that "the compensation amount which can be set to each of the dispersion compensation modules is selected from the selected two DCM menu values" is set. To put it specifically, a new constraint that Equation 5 expresses is added. Let s be an identifier (variable) for identifying a span. Let c be an identifier (variable) for identifying the selected two DCM menu values. Let dcmInfo[s, c] be a variable to be "1" if the DCM menu value c is a candidate for the span s and to be "0" otherwise. Let dcmVar[c] be a variable to be "1" if the DCM menu value c is selected and to be "0" otherwise.

$$\sum_{c} dcmInfo[s, c] \cdot dcmVar[c] = 1 (\text{for } \forall s) \quad \text{Equation 5}$$

If the objective function and the constraints in the mixed integer programming are set as described above, the decision value of the compensation amount of the dispersion compensation module that the nodes each have can be easily calculated by the use of all-purpose mathematical planning software. That is, one compensation amount to be practically applied to each of the dispersion compensation modules is calculated in such a way that the above objective function is satisfied in the above constraints.

The respective nodes are notified of the decision value of each of the dispersion compensation modules (one DCM menu value) resultantly obtained at the operation S16 via, e.g., the network management system (NMS). As a result, the dispersion compensation module that the nodes each have compensates the chromatic dispersion by the compensation amount indicated by the notified decision value.

According to the first exemplary operation, as described above, after the number of the DCM menu values is narrowed down on the basis of the compensation amount calculated while no attention is being paid to the DCM menu values, one DCM menu value practically applied to the dispersion compensation module as its compensation amount can be decided. In other words, according to the first exemplary operation, after the number of the DCM menu values is narrowed down on the basis of the compensation amount calculated by the use of mathematical programming causing a lighter processing load for arithmetic operation than that of the mixed integer programming, one DCM menu value to be the compensation amount of the dispersion compensation module can be decided by the use of the mixed integer programming. Thus, the design method of the first exemplary operation causes a relatively lighter processing load for deciding the compensation amount of each of the dispersion compensation modules than that caused by a comparative design method for deciding one DCM menu value applied to the dispersion compensation module as its compensation amount without narrowing down the number of the DCM menu values.

To put it specifically, assume, e.g., an optical network in which 26 add drop multiplexing nodes are connected to one another via 23 spans which each have chromatic dispersion of 1190 ps/mm. Assume that the add drop multiplexing nodes are each provided with a dispersion compensation module and that 21 types of DCM menu values are preset or prepared as the compensation amount of each of the dispersion compensation modules every 100 ps/nm in the range from 0 to −2000 ps/nm. In this case, the number of combinations of the DCM menu values in the 26 dispersion compensation modules is $21^{26}$. Thus, according to the comparative design method for deciding one DCM menu value applied to the dispersion compensation module as its compensation amount without narrowing down the number of the DCM menu values, it is necessary to decide the compensation amount of each of the dispersion compensation modules (i.e., to decide the one optimum combination) by calculating and estimating the objective function of each of the $21^{26}$ combinations. An experiment done by the inventor of the application resulted in that an operation for deciding the compensation amount is discontinued three hours after being started as running short of the memory. Incidentally, the inventor of the application used, in the experiment, an Intel Core 2 2.00 GHz CPU, a 2.00 GB memory and GLPK (Gnu Linear Programming Kit) V4.43 as a solver in the linear programming and the mixed integer programming.

Meanwhile, as the number of the DCM menu values of each of the dispersion compensation modules is narrowed down to two according to the first exemplary operation, the compensation amount of each of the dispersion compensation modules can be decided upon the objective function of each of the $2^{26}$ combinations being calculated. Incidentally, an experiment that the inventor of the application did spent approximately 85.4 seconds deciding the compensation amount of each of the dispersion compensation modules in accordance with the flow of the first exemplary operation in the same condition that the design method of the comparative example is in. To put it specifically, the experiment (i) spent approximately 0.4 seconds calculating the compensation amount of each of the dispersion compensation modules as illustrated at the operation S14 in FIG. 5, and (ii) spent approximately 85.0 seconds deciding the decision value of the compensation amount of each of the dispersion compensation modules as illustrated at the operation S16 in FIG. 5. As described above, the design method of the first exemplary operation causes a relatively lighter processing load for deciding the compensation amount of each of the dispersion compensation modules than that caused by the comparative design method.

Besides, two DCM menu values are selected on the basis of the calculated compensation amount according to the first exemplary operation. Thus, chromatic dispersion is not excessively or insufficiently compensated all over the optical network (or all over the wavelength path). To put it specifically, assume that two DCM menu values "−1000" and "−1100" are selected for all the dispersion compensation modules. If one DCM menu value (decision value of the compensation amount) is decided, both of dispersion compensation modules for which "−1000" is decided as the decision value and dispersion compensation modules for which "−1100" is decided as the decision value may possibly exist, as two DCM menu values are selected in this case. That is, "−1000" is hardly or not very often decided as the decision value for all the dispersion compensation modules. Similarly, "−1100" is hardly or not very often decided as the decision value for all the dispersion compensation modules. Thus, excessive and insufficient compensation can be averaged all over the optical network (or all over the wavelength path). Thus, the chromatic dispersion can be compensated precisely or of good quality. From a viewpoint of relatively reducing the processing load for deciding the compensation amount of each of the dispersion compensation modules, though, only one DCM menu value may be selected on the basis of the calculated compensation amount, as described later in detail as to a second exemplary operation.

Incidentally, the first exemplary operation described above is explained in a case where the two DCM menu values closest to the calculated compensation amount are selected. Three (or more) DCM menu values, however, closest to the calculated compensation amount may be selected. From a viewpoint of narrowing down the DCM menu values, however, the number of the DCM menu values selected on the basis of the calculated compensation amount should preferably be smaller than the total number of the DCM menu values. As being enabled to more or less narrow down the DCM menu values, the design method constituted in this way causes a relatively lighter processing load for deciding the compensation amount of each of the dispersion compensation modules than that caused by the comparative design method.

(2-3) Setting Priority of Wavelength Path

A priority of a wavelength path can be set on the basis of instructions of a user or a system designer input to the chromatic dispersion compensation design device 1 via the input device 11, or can be automatically set on the basis of the optical network data or various parameters. A method for automatically setting a priority of a wavelength path will be explained below.

(2-3-1) Method Based on Optical Network Data

The system designer can specify a wavelength path by using the optical network data described above. In this case, the specified wavelength path is set as a "high priority wavelength path", and another interval in which no "high priority wavelength path" is set in the optical network is automatically set as a "low priority wavelength path".

Figure 6:
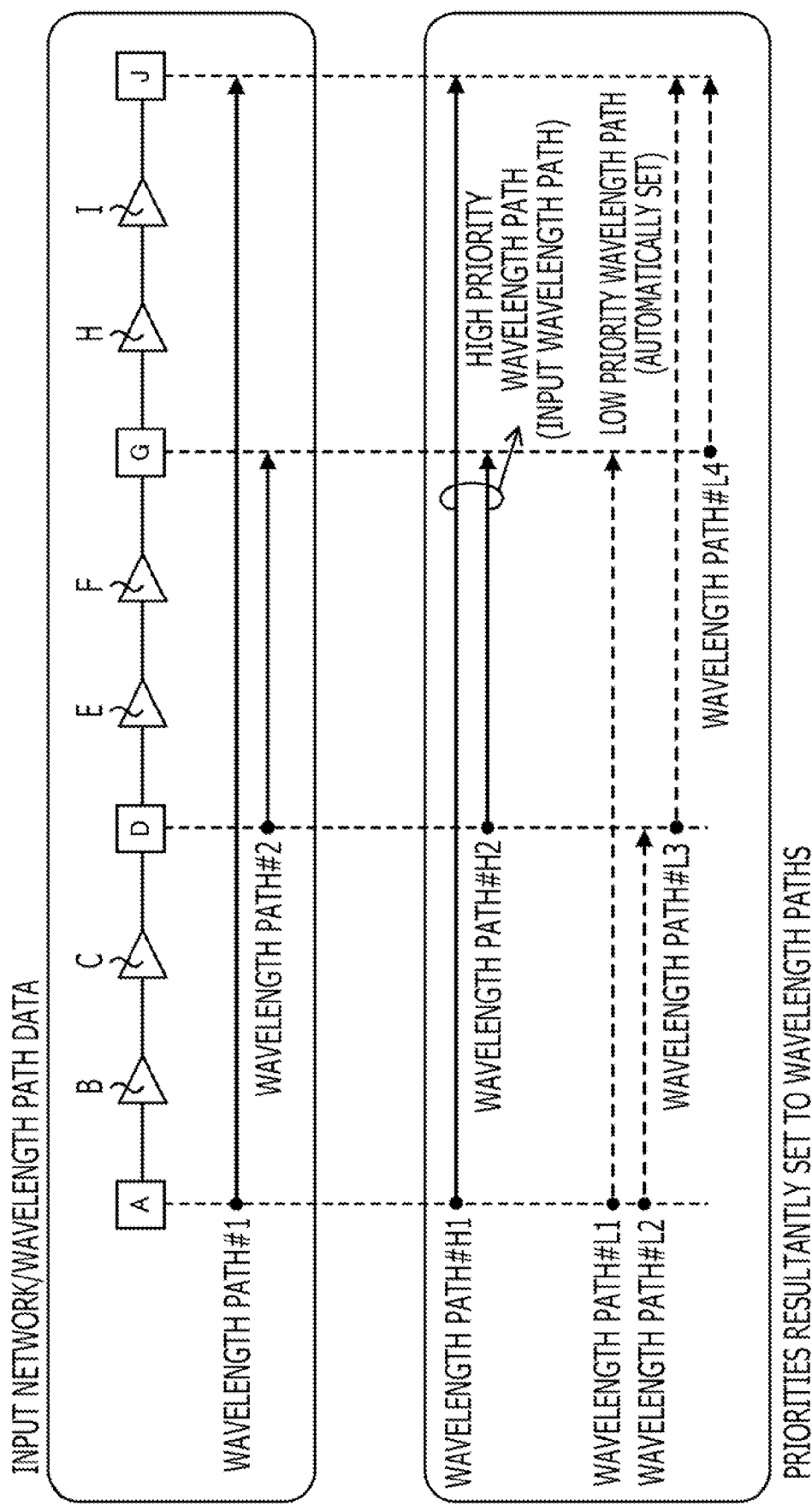
FIG. 6 illustrates an example of an optical network in which priorities of wavelength paths are set.

An example is explained with reference to FIG. 6. In FIG. 6, the optical network has four add drop multiplexing nodes A, D, G and J, and six optical relay nodes B, C, E, F, H and I. Then, assume that wavelength paths are specified between the nodes A and J and between the nodes D and G in the optical network data.

In this case, set the two wavelength paths specified in the optical network data as high priority wavelength paths (#H1, #H2). Then, extract a node interval in which no wavelength path exists in the optical network. At this time, the "node interval" refers to an interval between the add drop multiplexing nodes. As illustrated in FIG. 6, e.g., intervals A-G, A-D, D-J and G-J are extracted. Thus, wavelength paths to be set in the intervals A-G, A-D, D-J and G-J are set as low priority wavelength paths (#L1-#L4), respectively.

(2-3-2) Method Based on Throughput of Wavelength Path

The optical network data may include wavelength path data indicating a throughput of an optical signal transmitted via each of the wavelength paths. In this case, the priority of each of the wavelength paths may be set on the basis of the throughput. Incidentally, a policy of deciding a priority on the basis of the throughput may be specified as a design parameter to be input at the operation S1.

Quality of an optical signal is more likely to be affected by chromatic dispersion as the throughput is higher. Thus, in order to assure specific transmission quality, it is preferable to give a wavelength path which transmits an optical signal of a high throughput more strict conditions as to the residual chromatic dispersion. Thus, wavelength paths of throughputs higher and lower than a certain threshold may be set as a "high priority wavelength path" and a "low priority wavelength path", respectively.

Figure 7:
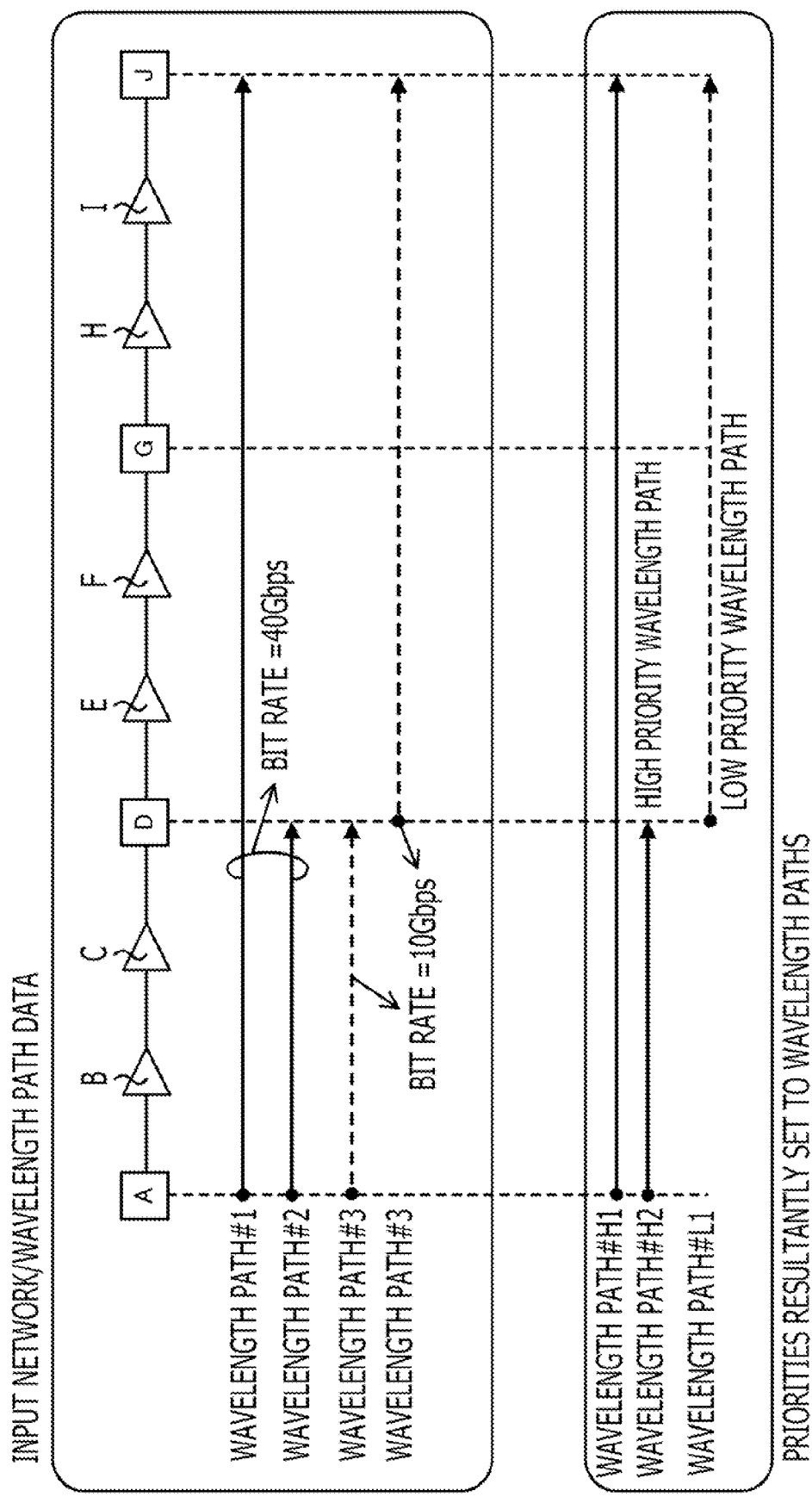
FIG. 7 illustrates an example of an optical network in which priorities of wavelength paths are set.

An example is explained with reference to FIG. 7. In FIG. 7, the optical network has four add drop multiplexing nodes A, D, G and J, and six optical relay nodes B, C, E, F, H and I. Then, a wavelength path of 40 Gbps is set in each of the intervals A-J and A-D. Further, a wavelength path of 10 Gbps is set in each of the intervals A-D and D-J.

In this case, a "high priority wavelength path" is set in the interval A-J in which a wavelength path of 40 Gbps exists. Further, a "low priority wavelength path" is set in the interval D-J in which a wavelength path of 10 Gbps exists. Meanwhile, wavelength paths of 10 Gbps and 40 Gbps exist in the interval A-D. If plural wavelength paths of different throughputs exist in a same interval, the priority may be identified on the basis of the highest throughput. Thus, a "high priority wavelength path" may be set in the interval A-D.

Figure 8:
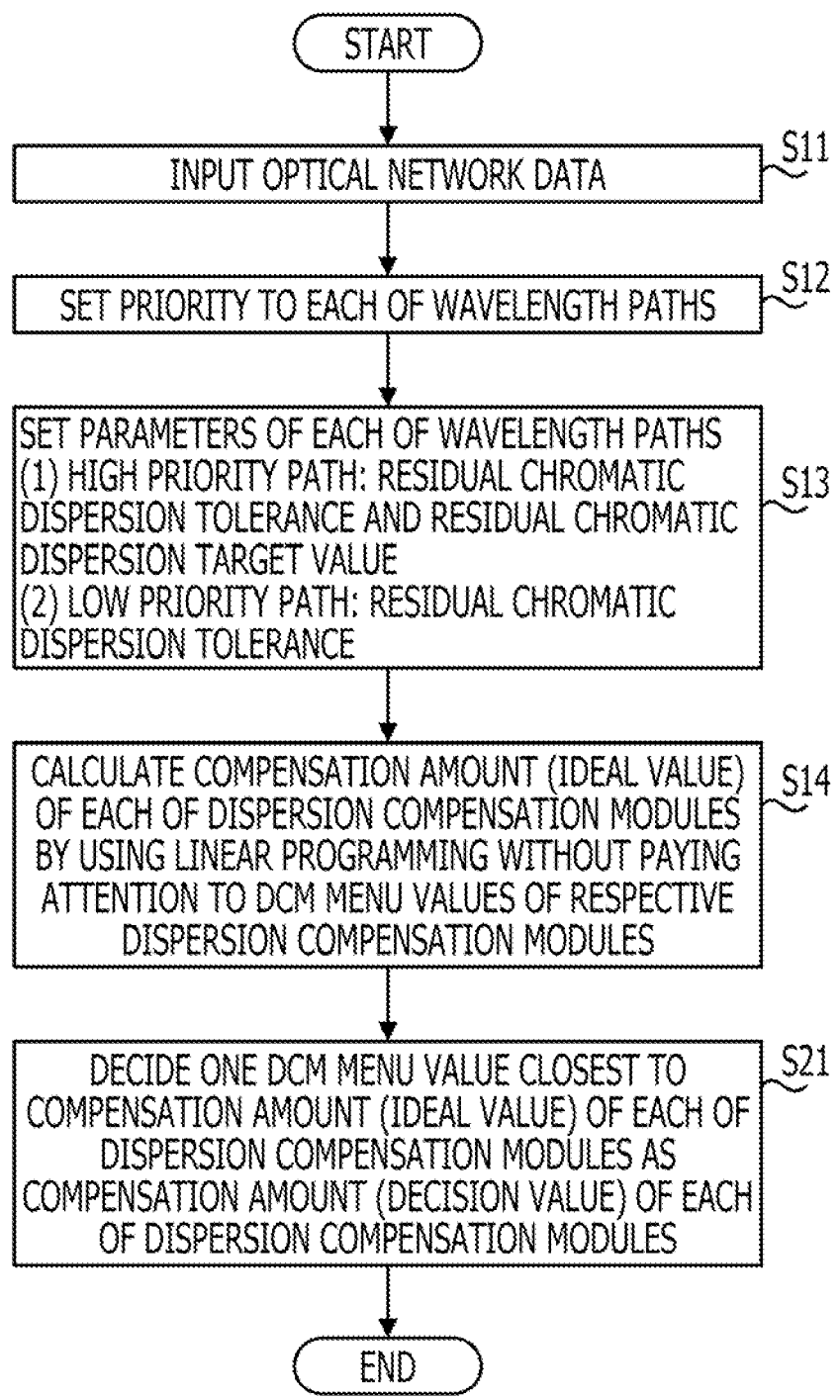
FIG. 8 illustrates a method of a second exemplary operation.

(3) Second Exemplary Operation of Chromatic Dispersion Compensation Design Device A second exemplary operation of the chromatic dispersion compensation design device 1 (i.e., a second exemplary method for designing chromatic dispersion compensation) will be explained with reference to FIG. 8. FIG. 8 is a method which illustrates a flow of the second exemplary operation (i.e., a flow of the second exemplary chromatic dispersion compensation design). Incidentally, an operation which is the same as the one included in the first exemplary operation described above is given the same reference numeral, and its detailed explanation will be omitted.

As illustrated in FIG. 8, the second exemplary operation includes the operations S11-S14 similarly as the first exemplary operation does. That is, provide the chromatic dispersion compensation design device 1 with the optical network data for the chromatic dispersion compensation design (operation S11). Then, set priorities to the respective wavelength paths (operation S12). Then, set the residual chromatic dispersion tolerances and the residual chromatic dispersion target values on the final nodes to the respective high priority wavelength paths (operation S13). Similarly, set the residual chromatic dispersion tolerances on the final nodes to the respective low priority wavelength paths (operation S13). Then, calculate the compensation amount of each of the dispersion compensation modules without paying attention to the DCM menu values (operation S14).

According to the second exemplary operation, the processor 16 works so as to select one DCM menu value closest to the compensation amount of the dispersion compensation module calculated at the operation S14 from a plurality of discrete menu values preset or prepared for each of the dispersion compensation modules. In other words, one DCM menu value of a smallest error against the compensation amount of the dispersion compensation module calculated at the operation S14 is selected from a plurality of discrete menu values preset or prepared for each of the dispersion compensation modules. Assume, e.g., that a plurality of DCM menu values which are "−1000, −950, −900, −850, −800, −700" are preset or prepared for a certain dispersion compensation module. If the compensation amount of the dispersion compensation module calculated at the operation S14 is "−880" in this case, the one DCM menu value "−900" closest to the calculated compensation amount is selected.

According to the second exemplary operation, the processor 16 further works so as to decide the selected one DCM menu value (i.e., the one DCM menu value closest to the calculated compensation amount) as one DCM menu value practically applied to each of the dispersion compensation modules as its compensation amount (i.e., the decision value of the compensation amount) (operation S21).

The respective nodes are notified of the decision value of each of the dispersion compensation modules (the one DCM menu value) resultantly obtained at the operation S21, e.g., via the network management system (NMS). As a result, the dispersion compensation module that the respective nodes each have compensates the chromatic dispersion by the compensation amount indicated by the notified decision value.

According to the second exemplary operation, as described above, the one DCM menu value closest to the calculated compensation amount itself can be decided as the one DCM menu value to be the compensation amount of the dispersion compensation module. Thus, the second exemplary operation does not need an operation using mixed integer programming causing a relatively heavy processing load for arithmetic operations, differently from the first exemplary operation. Thus, the design method of the second exemplary operation causes a relatively lighter processing load for deciding the compensation amount of each of the dispersion compensation modules further than that caused by the comparative design method.

Figure 9:
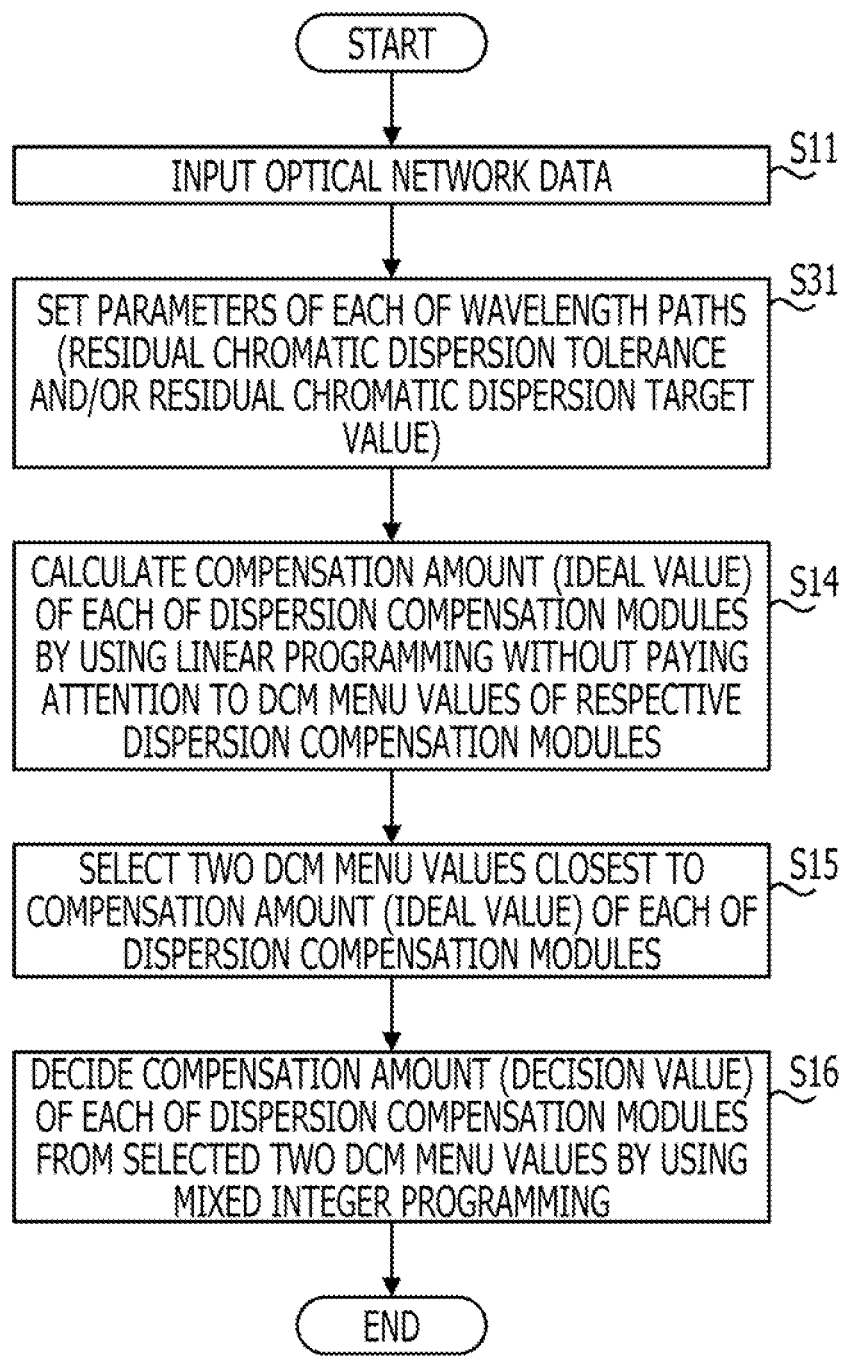
FIG. 9 illustrates a method of a third exemplary operation.

(4) Third Exemplary Operation of Chromatic Dispersion Compensation Design Device A third exemplary operation of the chromatic dispersion compensation design device 1 (i.e., a third exemplary method for designing chromatic dispersion compensation) will be explained with reference to FIG. 9. FIG. 9 is a method which illustrates a flow of the third exemplary operation (i.e., a flow of the third exemplary chromatic dispersion compensation design). Incidentally, an operation which is the same as the one included in the first or second exemplary operation described above is given the same reference numeral, and its detailed explanation will be omitted.

As illustrated in FIG. 9, the third exemplary operation includes the operation S11. That is, provide the chromatic dispersion compensation design device 1 with the optical network data for the chromatic dispersion compensation design (operation S11).

The third exemplary operation does not include the operation S12 illustrated in FIG. 5, which is different from the first exemplary operation. That is, the third exemplary operation does not need to set priorities to the respective wavelength paths. Thus, the third exemplary operation does not need to set distinct parameters to the respective wavelength paths of different priorities. That is, according to the third exemplary operation, the processor 16 works so as to set one and the same parameter without distinguishing the wavelength paths to be set (operation S31). To all the wavelength paths, e.g., at least one of the residual chromatic dispersion tolerance and the residual chromatic dispersion target value may be set.

After that, the third exemplary operation includes the operations S14-S16 similarly as the first exemplary operation does. That is, the third exemplary operation calculates the compensation amount of each of the dispersion compensation modules to be calculated without paying attention to the DCM menu values (operation S14). Then, the third exemplary operation selects two DCM menu values closest to the compensation amount of the dispersion compensation module calculated at the operation S14 from a plurality of discrete menu values preset or prepared for each of the dispersion compensation modules (operation S15). Then, the third exemplary operation decides one DCM menu value practically applied to each of the dispersion compensation modules as its compensation amount (i.e., the decision value of the compensation amount) from the two DCM menu values of each of the dispersion compensation modules selected at the operation S15 (operation S16).

Meanwhile, the third exemplary operation may include the operations S14 and S21 similar to the second exemplary operation. That is, the third exemplary operation may calculate the compensation amount of each of the dispersion compensation modules without paying attention to the DCM menu values (operation S14). Then, the third exemplary operation may select the one DCM menu value closest to the compensation amount of the dispersion compensation module calculated at the operation S14 from the plural discrete DCM menu values preset or prepared for each of the dispersion compensation modules (operation S21). The selected one DCM menu value (i.e., the one DCM menu value closest to the calculated compensation amount) may be decided as one DCM menu value practically applied to each of the dispersion compensation modules as its compensation amount (i.e., the decision value of the compensation amount) (operation S21).

Incidentally, as the third exemplary operation does not need to set the priorities to the wavelength paths, the constraints in the operations S14 and S16 may differ from the constraints in the first exemplary operation. To put it specifically, if both the residual chromatic dispersion tolerances and the residual chromatic dispersion target values on the final nodes are set to all the wavelength paths, it is preferable to use an objective function expressed by Equation 6 and constraints expressed by Equations 7-9 rather than the objective function expressed by Equation 1 and the constraints expressed by Equations 2-4. Meanwhile, if the residual chromatic dispersion tolerances on the final nodes are set to all the wavelength paths (in other words, no residual chromatic dispersion target values are set), it is preferable to use the objective function expressed by Equation 6 and the constraints expressed by Equations 8-9 rather than the objective function expressed by Equation 1 and the constraints expressed by Equations 2-4. Meanwhile, if the residual chromatic dispersion target values on the final nodes are set to all the wavelength paths (in other words, no residual chromatic dispersion tolerances are set), it is preferable to use the objective function expressed by Equation 6 and the constraint expressed by Equation 7 rather than the objective function expressed by Equation 1 and the constraints expressed by Equations 2-4. Let $G_i$ be an identifier (variable) for identifying the wavelength paths.

$$\text{Minimize} \sum_{Gh_i} (negRDerror[G_i] + posRDerror[G_i]) \quad \text{Equation 6}$$

$$term[G_i] - posRDerror[G_i] + negRDerror[G_i] = \quad \text{Equation 7}$$
$$RDtarget[G_i](\text{for } \forall G_i)$$

$$term[G_i] - RDtolerance\_upper[G_i] \le 0 (\text{for } \forall G_i) \quad \text{Equation 8}$$

$$term[G_i] - RDtolerance\_lower[G_i] \ge 0 (\text{for } \forall Gi) \quad \text{Equation 9}$$

As described above, the design method of the third exemplary operation causes a relatively lighter processing load for deciding the compensation amount of each of the dispersion compensation modules than that caused by the comparative design method even if no priorities are set to the wavelength paths. That is, various effects which can be enjoyed owing to the first exemplary operation can be preferably enjoyed owing to the third exemplary operation even if no priorities are set to the wavelength paths.

Figure 10:
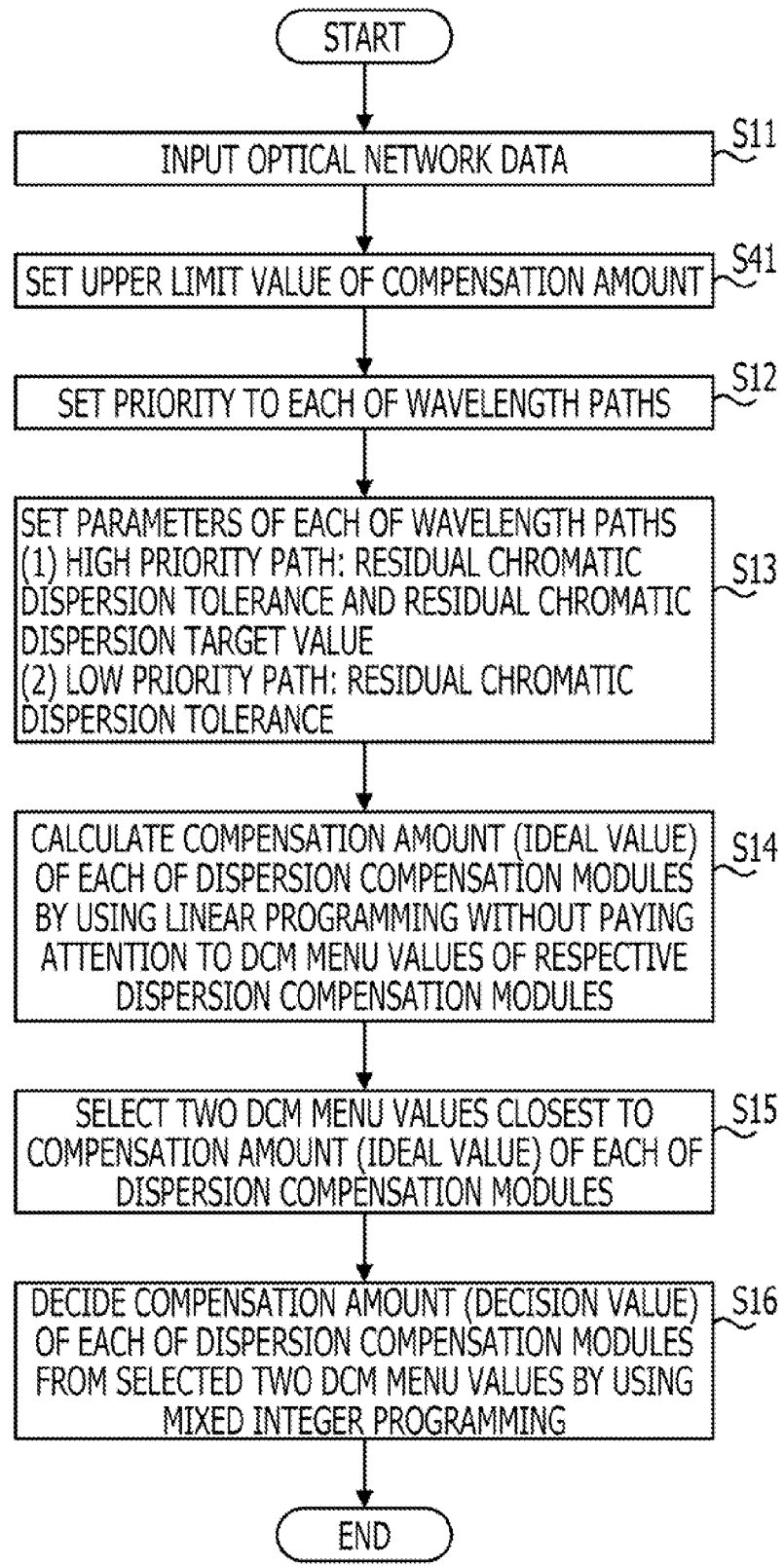
FIG. 10 illustrates a method of a fourth exemplary operation.

(5) Fourth Exemplary Operation of Chromatic Dispersion Compensation Design Device A fourth exemplary operation of the chromatic dispersion compensation design device 1 (i.e., a fourth exemplary method for designing chromatic dispersion compensation) will be explained with reference to FIG. 10. FIG. 10 is a method which illustrates a flow of the fourth exemplary operation (i.e., a flow of the fourth exemplary chromatic dispersion compensation design). Incidentally, an operation which is the same as the one included in the first, second or third exemplary operation described above is given the same reference numeral, and its detailed explanation will be omitted.

As illustrated in FIG. 10, the fourth exemplary operation includes the operation S11 similar to the first exemplary operation. That is, provide the chromatic dispersion compensation design device 1 with the optical network data for the chromatic dispersion compensation design (operation S11).

According to the fourth exemplary operation, the processor 16 works differently from the first exemplary operation so as to set at least one of the upper and lower limit values of the compensation amount of each of the dispersion compensation modules (operation S41). Incidentally, at least one of the upper and lower limit values of the compensation amount is set at the operation S41 in order that cross phase modulation (XPM) degradation caused by an optical transmission channel loss (span loss) and the compensation amount of the dispersion compensation module agreeing with each other is prevented. Thus, it is preferable to set a proper value as at least one of the upper and lower limit values of the compensation amount at the operation S41 so that the cross phase modulation degradation can be prevented while the optical transmission channel loss is being paid attention to.

After that, the fourth exemplary operation includes the operations S12-S16 similar to the first exemplary operation. That is, the fourth exemplary operation sets priorities to the respective wavelength paths (operation S12). Then, the fourth exemplary operation sets the residual chromatic dispersion tolerance and the residual chromatic dispersion target value on the final node to each of the high priority wavelength paths (operation S13). Similarly, the fourth exemplary operation sets the residual chromatic dispersion tolerance on the final node to each of the low priority wavelength paths (operation S13). The fourth exemplary operation calculates the compensation amount of each of the dispersion compensation modules without paying attention to the DCM menu values (operation S14). Then, the fourth exemplary operation selects two DCM menu values closest to the compensation amount of the dispersion compensation module calculated at the operation S14 from a plurality of discrete menu values preset or prepared for each of the dispersion compensation modules (operation S15). Then, the fourth exemplary operation decides one DCM menu value practically applied to each of the dispersion compensation modules as its compensation amount (i.e., the decision value of the compensation amount) from the two DCM menu values of each of the dispersion compensation modules selected at the operation S15 (operation S16).

Incidentally, as at least one of the upper and lower limit values of the compensation amount is set, the compensation amount calculated at the operation S14 is preferably not greater than the upper limit value of the compensation amount or is not smaller than the lower limit value of the compensation amount. If a compensation amount being greater than the upper limit value of the compensation amount is calculated, the upper limit value itself may be handled as the calculated compensation amount. Meanwhile, if a compensation amount being smaller than the lower limit value of the compensation amount is calculated, the lower limit value itself may be handled as the ideal value. Meanwhile, another value may be handled as the calculated compensation amount.

Similarly, the two DCM menu values selected at the operation S15 is preferably not greater than the upper limit value of the compensation amount or not smaller than the lower limit value of the compensation amount. That is, the two DCM menu values satisfying condition of not being greater than the upper limit value (or not being smaller than the lower limit value) and being closest to the calculated compensation amount should preferably be selected from the plural DCM menu values at the operation S15.

Meanwhile, the fourth exemplary operation may include the operations S12-S21 similar to the second exemplary operation. That is, the one DCM menu value closest to the compensation amount of the dispersion compensation module calculated at the operation S14 may be selected from the plural discrete DCM menu values preset or prepared for each of the dispersion compensation modules instead of the two DCM menu values closest to the compensation amount of the dispersion compensation module calculated at the operation S14 (operation S21). The selected one DCM menu value (i.e., the one DCM menu value closest to the calculated compensation amount) may be decided as one DCM menu value practically applied to each of the dispersion compensation modules as its compensation amount (i.e., the decision value of the compensation amount) (operation S21).

As described above, the design method of the fourth exemplary operation causes a relatively lighter processing load for deciding the compensation amount of each of the dispersion compensation modules than that caused by the comparative design method even if at least one of the upper and lower limit values of the compensation amount is set. That is, various effects which can be enjoyed owing to the first exemplary operation can be preferably enjoyed owing to the fourth exemplary operation even if at least one of the upper and lower limit values of the compensation amount of the dispersion compensation module is set.

Incidentally, the fourth exemplary operation may omit to set the priorities to the respective wavelength paths similar to the third exemplary operation.

The invention is not limited to the embodiment described above. The invention can be suitably modified within the gist and the idea of the invention which can be read from the claims and the entire specification. A method and a device for chromatic dispersion compensation design including such modifications are within the scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A design method for compensating chromatic dispersion, the design method comprising:
   calculating a calculated compensation amount of a dispersion compensation module arranged on each of a plurality of wavelength paths in such a way that a residual chromatic dispersion value of each of the wavelength paths which transmits an optical signal between an initial node and a final node satisfies a tolerance condition given in accordance with a priority given to each of the wavelength paths; and
   deciding a decision value to be applied as the compensation amount of the dispersion compensation module based on the calculated compensation amount based on a plurality of candidate values each being prepared in advance as a candidate for the compensation amount of the dispersion compensation module, wherein the decision value is decided based on the plural candidate values in such a way that a residual chromatic dispersion value of each of the wavelength paths satisfies a specific condition, the specific condition is such that:
   (i) a summation of an error between a residual chromatic dispersion value of a first wavelength path included in the plural wavelength paths and a residual chromatic dispersion target value corresponding to the first wavelength path is minimized, the first wavelength path being assigned a highest priority; and that
   (ii) a residual chromatic dispersion value of a second wavelength path being lower in priority than the first wavelength path remains within a tolerable residual chromatic dispersion range corresponding to the second wavelength path.

2. The design method for compensating chromatic dispersion according to claim 1, wherein one of the plural candidate values being closest to the calculated compensation amount is decided as the decision value.

3. The design method for compensating chromatic dispersion according to claim 1, further comprising selecting at least two of the plural candidate values based on the calculated compensation amount, wherein:
   the decision value is decided based on the selected at least two candidate values.

4. The design method for compensating chromatic dispersion according to claim 3, wherein at least two of the plural candidate values are selected in order of being closest to an ideal value.

5. The design method for compensating chromatic dispersion according to claim 4, wherein the ideal value is calculated by the use of linear programming.

6. The design method for compensating chromatic dispersion according to claim 5, further comprising:
   setting a target function such that a summation of an error between the residual chromatic dispersion value of each of the wavelength paths and a residual chromatic dispersion target value corresponding to each of the wavelength paths is minimized; and
   constraining a residual chromatic dispersion value of each of the wavelength paths to remain within a tolerable residual chromatic dispersion range corresponding to each of the wavelength paths.

7. The design method for compensating chromatic dispersion according to claim 5, further:
   setting a target function such that a summation of an error between the residual chromatic dispersion value of a first wavelength path included in the plural wavelength paths and a residual chromatic dispersion target value corresponding to the first wavelength path is minimized; and
   constraining a residual chromatic dispersion value of a second wavelength path being lower in priority than the first wavelength path to remain within a tolerable residual chromatic dispersion range corresponding to the second wavelength path.

8. The design method for compensating chromatic dispersion according to claim 4, wherein the ideal value is calculated independently of the candidate values.

9. The design method for compensating chromatic dispersion according to claim 1, wherein the decision value is decided by a use of mixed integer programming.

10. The design method for compensating chromatic dispersion according to claim 1, wherein the specific condition is such that a summation of an error between the residual chromatic dispersion value of each of the wavelength paths and a residual chromatic dispersion target value corresponding to each of the wavelength paths is minimized.

11. A chromatic dispersion compensation design device which designs chromatic dispersion compensation of a plurality of wavelength paths each being configured to transmit an optical signal between an initial node and a final node in an optical network having a plurality of optical nodes to be connected via an optical transmission channel, the chromatic dispersion compensation design device comprising:
   a processor to calculate an ideal value of a compensation amount of a dispersion compensation module put on each of the wavelength paths in such a way that a residual chromatic dispersion value of each of the wavelength paths satisfies a specific condition; and
   a decision unit to decide a decision value to be applied as the compensation amount of the dispersion compensation module from a plurality of candidate values each being prepared in advance as a candidate of the compensation amount of the dispersion compensation module on the basis of the ideal value,
   wherein the decision value is decided based on the plural candidate values in such a way that a residual chromatic dispersion value of each of the wavelength paths satisfies a specific condition, the specific condition is such that:
   (i) a summation of an error between a residual chromatic dispersion value of a first wavelength path included in the plural wavelength paths and a residual chromatic dispersion target value corresponding to the first wavelength path is minimized, the first wavelength path being assigned a highest priority; and that
   (ii) a residual chromatic dispersion value of a second wavelength path being lower in priority than the first wavelength path remains within a tolerable residual chromatic dispersion range corresponding to the second wavelength path.

12. A design method for compensating chromatic dispersion, the design method comprising:

assigning at least two wavelength paths different priorities;
giving a tolerance condition related to a residual chromatic dispersion amount in accordance with the priorities; and
calculating a compensation amount of a dispersion compensation module put on each of the wavelength paths in such a way that a residual chromatic dispersion value of each of the wavelength paths which transmit an optical signal between an initial node and a final node related to the at least two wavelength paths satisfies the tolerance condition given in accordance with the priorities assigned to the respective wavelength paths,
wherein: a decision value to be applied as the compensation amount of the dispersion compensation module on the basis of the calculated compensation amount is decided based on a plurality of candidate values each prepared in advance as a candidate of the compensation amount of the dispersion compensation module,
the decision value is decided based on the plural candidate values in such a way that a residual chromatic dispersion value of each of the wavelength paths satisfies a specific condition, the specific condition is such that:
(i) a summation of an error between a residual chromatic dispersion value of a first wavelength path included in the plural wavelength paths and a residual chromatic dispersion target value corresponding to the first wavelength path is minimized, the first wavelength path being assigned a highest priority; and that
(ii) a residual chromatic dispersion value of a second wavelength path being lower in priority than the first wavelength path remains within a tolerable residual chromatic dispersion range corresponding to the second wavelength path.

* * * * *